United States Patent
Wilinski et al.

(10) Patent No.: US 6,810,134 B2
(45) Date of Patent: Oct. 26, 2004

(54) METHOD, SYSTEM AND APPARATUS FOR CHOOSING AN OPTIMAL CANDIDATE VALUE FOR BLOCK MATCHING

(75) Inventors: Piotr Wilinski, Eindhoven (NL); Marc Joseph Rita Op de Beeck, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 593 days.

(21) Appl. No.: 09/850,347

(22) Filed: May 7, 2001

(65) Prior Publication Data
US 2002/0009210 A1 Jan. 24, 2002

(30) Foreign Application Priority Data
May 19, 2000 (EP) .............................................. 00201772

(51) Int. Cl.[7] ................................................. G06K 9/00
(52) U.S. Cl. ...................................... 382/107; 382/236
(58) Field of Search ............................... 382/100, 232, 382/218, 219, 236, 239, 244, 238, 107, 103; 345/474; 348/121, 441, 47, 700; 375/240.11, 240.12, 240.16

(56) References Cited

U.S. PATENT DOCUMENTS

| | | | | |
|---|---|---|---|---|
| 5,642,294 A | * | 6/1997 | Taniguchi et al. | .......... 348/700 |
| 5,802,361 A | * | 9/1998 | Wang et al. | ................ 382/217 |
| 5,946,044 A | * | 8/1999 | Kondo et al. | ................ 348/458 |
| 6,030,344 A | * | 2/2000 | Guracar et al. | ............. 600/447 |
| 6,091,777 A | * | 7/2000 | Guetz et al. | ........... 375/240.11 |
| 6,204,876 B1 | * | 3/2001 | Uomori et al. | ................ 348/47 |
| 6,205,177 B1 | * | 3/2001 | Girod et al. | ........... 375/240.14 |
| 6,298,144 B1 | * | 10/2001 | Pucker et al. | ................ 382/103 |
| 6,335,985 B1 | * | 1/2002 | Sambonsugi et al. | ....... 382/190 |
| 6,430,223 B1 | * | 8/2002 | Lim | ..................... 375/240.16 |
| 6,552,742 B1 | * | 4/2003 | Seta | ........................... 348/42 |

FOREIGN PATENT DOCUMENTS

| | | | |
|---|---|---|---|
| DE | 197441343 | 4/1999 | |
| WO | WO9746020 | 5/1997 | |
| WO | WO 99/40726 | * 12/1999 | ............ H04N/7/34 |

* cited by examiner

Primary Examiner—Jayanti K. Patel

(57) ABSTRACT

In block-based motion or depth estimation, a block is assigned a motion or depth value as a result of minimizing the matching error over a limited set (45) of candidate values. This set (45) usually comprises one random motion or depth value, to prevent the algorithm from stacking in local minimums. The method and system according to the invention instead add to this set (45) one motion or depth value based on properties of the image. A history of temporal changes for chosen motion or depth values is recorded, a histogram is made and a plurality of values is created in proportion to the histogram. The one added value is chosen from this plurality. Additionally, information about the direction of the changes is recorded to prevent oscillation. An apparatus for adapting a video signal (40) uses the chosen candidate values to create an enhanced version of the video signal (40).

10 Claims, 1 Drawing Sheet

METHOD, SYSTEM AND APPARATUS FOR CHOOSING AN OPTIMAL CANDIDATE VALUE FOR BLOCK MATCHING

BACKGROUND OF THE INVENTION

The invention relates to a method of choosing an optimal candidate value to be used for matching a block from a first image with an area from a second image, the method comprising:

(a) making a set of candidate values for determining an area to be matched from the second image,
(b) for each candidate value from the set, determining an area to be matched from the second image, based on said candidate value, matching the block from the first image with this area and calculating a matching error, and
(c) choosing the optimal candidate value from the set based on the calculated matching errors.

The invention likewise relates to a system for choosing an optimal candidate value to be used for matching a block from a first image with an area from a second image, the system comprising:

a collector, which is arranged for making a set of candidate values for determining an area to be matched from the second image,
a matcher, which is arranged for determining for each candidate value from the set based on said candidate value an area to be matched from the second image, matching the block from the first image with this area and calculating a matching area, and
a selector, which is arranged for choosing the optimal candidate value from the set based on the calculated matching errors.

The invention relates to a method and apparatus for processing a video signal that comprises a variety of images.

A method of the type defined in the opening paragraph is known from international patent application published under number WO 99/40726 (PHN 17.017) by the same applicants which is incorporated by reference herein. With block-based techniques for determining motion and depth in an image, the image is divided into a number of blocks, for example, rectangles of equal size. The image may then be compared with another image by matching the individual blocks in the other image.

Matching a block with a second image is effected by choosing a number of candidate values for the motion vector or the depth and then determining for each candidate value in how far the block corresponds to an area in the second image. The degree of deviation in this match may be calculated. This deviation is called the matching error that belongs to the candidate value. The optimal candidate value is the candidate value that has a relatively small matching error. Suitable candidate values are, inter alia, the depths or the motion vectors of adjacent blocks from the first image, because they are likely to have approximately the same characteristics as the present block. Since a block comprises pixels, the matching error may be determined on the basis of the corresponding pixels in the block from the first image and in the area in the second image. A mathematical technique such as determining the mean square error (MSE) is suitable for this purpose.

The method described above may be repeated a number of times to come to the best possible choice of the optimal candidate value. In the case where the depth in the image is determined, the depths are initially chosen at random. With each repetition the values of adjacent blocks are used then, which may differ from the previous repetition. The newly found value having the smallest matching error is subsequently used for calculating the matching error of other blocks. When the values do not change any longer, the final depth has been determined and the repetitions may be stopped. With each repetition, the current value for the optimal candidate value and the matching error are to be saved for each block.

It is common practice that a random motion vector or depth value is added to said set, or an already added value is added once again after a random value has been added thereto. This avoids that repeatedly executing the method only provides locally optimal candidate values.

A disadvantage of this method is that by adding a random value either or not based on a value that has already been added, it takes longer than necessary for the final depth or motion vector to be determined. Moreover, oscillations may occur around the final value, because the randomly chosen value negatively affects the process.

SUMMARY OF THE INVENTION

It is an object of the invention to provide a method of the type defined in the opening paragraph, in which a better choice for the optimal candidate value is made.

This object is achieved with the method according to the invention in that a variety of candidate values is determined, which candidate values are determined based on properties of the first image, and step (a) also includes the adding of a candidate value to the set which is chosen from said variety. Adding this candidate value provides a better choice for the optimal candidate value, because this candidate value better suits to the first image than a randomly chosen candidate value. Indeed, the variety is determined based on properties of the first image.

In an embodiment of the method the properties of the first image also include temporal changes of the value of previously chosen optimal candidate values for blocks from the first image. If, for example, the method is executed several times, previously obtained optimal candidate values are available. On the basis of these values, the variety may be formed so that it fits with the changes. If many large changes occur, the variety may be formed with many large candidate values, because this fits well with the first image.

In a further embodiment of the method, a histogram is made of said changes and the variety is determined in proportion to a distribution in the histogram. This embodiment is advantageous in that there may now be simply determined what kind of changes occur, for example, major, medium and minor, so that a variety may be formed that fits well with the first image.

In a further embodiment of the method, the properties of the first image also include a direction of temporal changes of the value of previously chosen optimal candidate values for blocks from the first image. This embodiment is advantageous in that with the aid of these properties there may be determined whether a repeated execution of the method leads to oscillation of the optimal candidate value chosen with each repetition around a certain point. In that case, the variety may be chosen such that oscillation is terminated.

It is also an object of the invention to provide a system of the type defined in the introductory part, with which a better choice for the optimal candidate value is made.

This object is achieved with the system in accordance with the invention in that the system is arranged for determining a variety of candidate values, which candidate values are determined based on properties of the first image, and the collector is also arranged for adding a candidate value to the set that is chosen from said variety.

The system determines said variety and renders it available to the collector, so that the latter can choose herefrom a candidate value and add it to the set.

In an embodiment of the system the properties of the first image also include temporal changes of the value of previously chosen optimal candidate values for blocks from the first image.

In a further embodiment of the system the system is arranged for making a histogram of said changes and for determining the variety in proportion to a distribution in the histogram.

In an embodiment of the system the properties of the first image also include a direction of temporal changes of the value of previously chosen optimal candidate values for blocks from the first image.

It is also an object of the invention to provide an apparatus of the type defined in the introductory part, with which a better processing of the video signal is provided.

This object is achieved with the apparatus in accordance with the invention, in that the apparatus comprises:

a system according to the invention for choosing an optimal candidate value to be used for matching a block from a first image with an area from a second image, the system being arranged for choosing optimal candidate values for blocks from the images from said variety, and an image processor for processing the video signal to obtain an enhanced video signal based on the obtained optimal candidate values as determined by said system.

The image processor enhances the image on the basis of the optimal candidate value that is chosen by a system in accordance with the invention. Since a better choice of the optimal candidate value is made with this system, this will lead to an enhanced image that is better than with other apparatus.

In one embodiment the apparatus further includes a display system for displaying an enhanced video signal.

These and other aspects of the invention are apparent from and will be elucidated with reference to the embodiment(s) described hereinafter.

DETAILED DESCRIPTION OF A PREFERRED EMBODIMENT OF THE INVENTION

Figure 1:
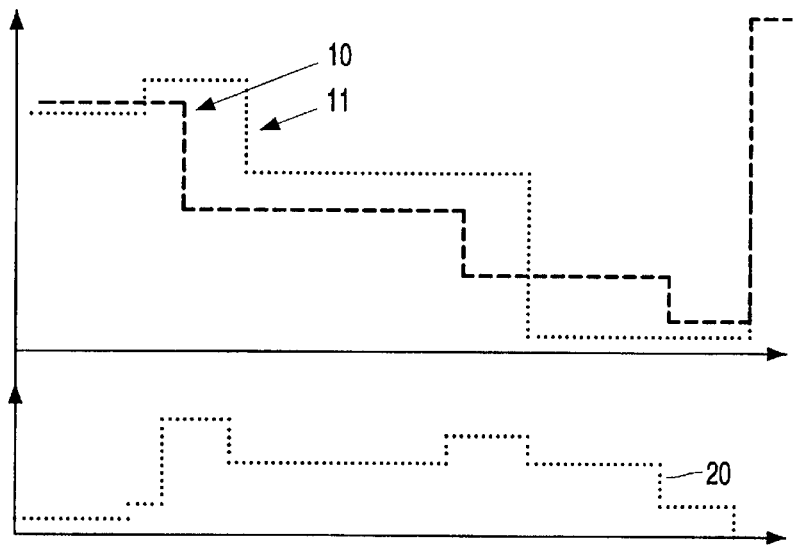
FIG. 1 is a diagrammatic representation of a plurality of graphs of candidate values and their matching errors.

In block-based techniques for determining motion and depth in a first image, the image is subdivided into a number of blocks. These blocks may be rectangular and of equal size, so that the subdivision may be effected in a simple and fast manner, although it is alternatively possible to utilize arbitrary other shapes. The use of non-rectangular blocks is advantageous in that now arbitrary objects may be covered by a group of blocks, so that motion or depth of such an object can be determined. By subdividing the image into blocks, it is now possible to compare the image with a second image by matching the blocks from the first image with an area from the second image. If the blocks are chosen sufficiently small, there may be assumed that each block moves uniformly and that the depth in a block is the same everywhere. It is then possible to look for an area from the second image that corresponds to a block from the first image. If this is found, the shift of this block in between the two images may be determined and thus the motion of this block. If the two images both relate to a still object, this provides the information that is necessary for determining the depth of this object.

Rarely will it happen that a block from the first image fully matches an area from the second image. This problem is solved by determining, on the basis of the candidate value for the depth or for the motion vector, where the block from the first image would have to be situated in the second image. Subsequently, the area from the second image corresponding to this is matched with the first block and the degree of deviation of the match may be calculated. This deviation is called the matching error of the candidate value. The optimal candidate value is the candidate value having a relatively small matching error, preferably the smallest matching error.

Since a block consists of pixels, the matching error may be determined on the basis of the corresponding pixels in the two blocks. A mathematical technique such as determining the mean square error (MSE) is suitable for this purpose. With this technique the matching error for a motion vector (dx, dy) can be calculated as follows:

$$MSE(i, j) = \sum_{m=1}^{M} \sum_{n=1}^{N} [U_1(m, n) - U_0(m + dx, n + dy)]^2$$

Herein M and N are the dimensions of the block in pixels and $U_i(m, n)$ is the pixel intensity in image i at location (m, n). Calculating the matching error for a depth d takes place in similar manner.

Another suitable mathematical technique is calculating the sum of absolute differences (SAD). The matching error for a depth d may be calculated herewith as follows:

$$SAD(d) = \sum_{(x,y) \in B} |U_1(x + \Delta x(d), y + \Delta y(d)) - U_0(x, y)|$$

Herein, (x, y) is a pixel in a block B and $\Delta x(d)$ is the change of x based on the candidate value for the depth d.

In addition to the mean square error and the sum of absolute differences, also other mathematical techniques, such as the mean absolute difference or the sum of square errors may be used for calculating the matching error of a candidate value for the depth or for a motion vector.

For practical reasons, inter alia, because there is only little time to process a separate image during video signal processing, usually a set with a limited number of candidate values is made, which are subsequently used, as described above, for determining an area from the second image, after which the block from the first image is matched therewith. It is common practice that the values for the depth or the found motion vector of adjacent other blocks are chosen, possibly added by a random value or a previously calculated value for the depth or the motion vector for this block. After the matching errors of the elements of the set have been calculated, the optimal candidate value is chosen as the candidate value having the smallest matching error.

The steps of making the set, calculating the matching errors of the elements of this set and choosing the optimal candidate value may be executed as three separate steps, but also in combination. For each chosen candidate value the matching error may be calculated directly, for example, after which this matching error can be compared with a "running minimum". If a matching error that has just been calculated turns out to be smaller than this running minimum, the current candidate value is chosen as a provisional optimal candidate value and its matching error as a new running minimum. After all the candidate values in the set have been chosen, the thus determined provisional optimal candidate value now becomes the real optimal candidate value.

The method described above may be repeated a number of times to come to the best possible choice of the optimal candidate value. In the case where the depth in the image is determined, initially the depths are chosen at random. With each repetition the values of adjacent blocks are used then, which values may be different from the values of the previous repetition. The newly found value having the smallest matching error is subsequently used for calculating the matching error of other blocks. When the values no longer change, the final value is determined and repetitions may be stopped. With each repetition, the current value for the optimal candidate value and the matching error are to be saved for each block.

It is common practice to add a random motion vector or depth value to said set, or to add an already added value once again after a random value has been added. This avoids that repetitive execution of the method only locally provides optimal candidate values. This random motion vector or depth value often comes from a predetermined variety of values, so that it is not necessary to generate one or more random values for each block.

In the method according to the invention a candidate value is added to said set, which candidate value comes from a variety of candidate values. This variety of candidate values is first determined, for example preceding a repetition of the method described above. The candidate values from this variety are determined based on properties of the first image. These properties may also include temporal changes of the value of previously chosen optimal candidate values for blocks from the first image.

FIG. 1 shows a graph of block depths in a first image, which are determined with the method described above. A comparable graph may be made for motion vectors. When the graph relates to depth candidate values, the smallest values are used for the depth minimums of the graph. With motion vector candidate values, each candidate value is a vector having components for the horizontal and vertical movement. In that case a motion vector candidate value is a minimum of the graph when one of the components of this vector is smaller than the corresponding components of the other vectors.

Figure 2:
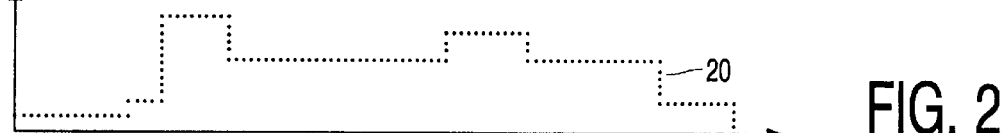
FIG. 2 is a diagrammatic representation of the change in a plurality of graphs of candidate values and their matching errors.

The block depths from the first image are plotted on the y-axis against the blocks on the x-axis in the graph shown in FIG. 1. Curve 10 denotes block depths as they are determined for a first repetition of the method described above, and the curve 11 shows depths as determined for a second repetition. The curves 10 and 11 may also be obtained in different manners, for example, via an algorithm that statistically determines depth values, or by making use of depth information from an external source. Based on the curves 10 and 11, a new graph may be made, which shows the absolute differences of block depths. This graph is shown in FIG. 2. Curve 20 is obtained by determining for each point on the x axis of the graph of FIG. 1 the absolute difference between the values of curves 10 and 11, and plotting this difference against the corresponding point on the x axis of the graph of FIG. 2.

Figure 3:
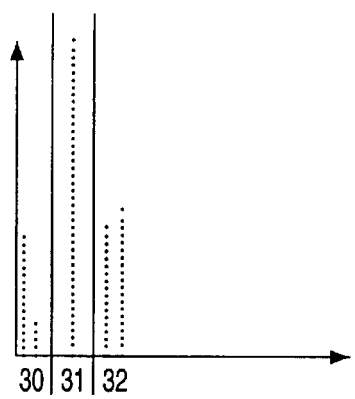
FIG. 3 is a histogram with changes of candidate values grouped according to size.

Based on the graph of FIG. 2, a histogram of the changes is made, which is shown in FIG. 3. The values of the curve 20 are grouped based on their frequency of occurrence. Group 30 contains small values from the graph of FIG. 2, group 32 large values from this graph and group 31 intermediate values. The boundaries between the groups 30, 31 and 32 are chosen arbitrarily and depend on the total number of blocks that are taken into consideration and their relative distribution. In case group 32 has very few values, the group 32 may be enlarged by shifting the boundary between group 32 and group 31.

From the histogram of FIG. 3 it turns out that there are relatively few minor depth changes in the first image. Indeed, group 30 contains few values and these values represent depth changes as obtained in the graph of FIG. 2. Similarly, there are relatively few large changes and relatively many medium changes.

Now a variety of values is made, which values are chosen in proportion to the histogram of FIG. 3. Starting from the histogram, a variety is formed which contains relatively few large and small values and relatively many intermediate values.

In the above-described method of determining an optimal candidate value, a set of candidate values is made for determining an area to be matched from a second image. To this set is also added a candidate value that is chosen from a variety of candidate values which are determined on the basis of properties from the first image, such as depth changes, which appears from the histogram of FIG. 3.

The graph of FIG. 1, and thus the histogram of FIG. 3, may be constructed for the entire first image or a sub-area thereof. In the latter case separate varieties are made for each sub-area. These varieties may also be adapted after one or more repetitions of the method of determining an optimal candidate value by re-constructing the graph of FIG. 1 and making a new histogram.

The choice of a candidate value from this variety may be made on the basis of previously chosen optimal candidate values for the block from the first image that is going to be matched. If it turns out that it is a matter of major changes in these previously chosen optimal candidate values, a large candidate value is chosen from the variety. If it appears that there were only minor changes between these previously chosen optimal candidate values, it is better to choose a small candidate value from the variety.

To avoid oscillations around a candidate value, another property of the first image can be used, that is, information about the direction of the changes in previously chosen optimal candidate values. So doing, there may be detected whether this direction changes continuously, and thus there may be detected whether it is a matter of oscillations. A candidate value having the same direction as a previously chosen optimal candidate value is then chosen from the variety.

Figure 4:
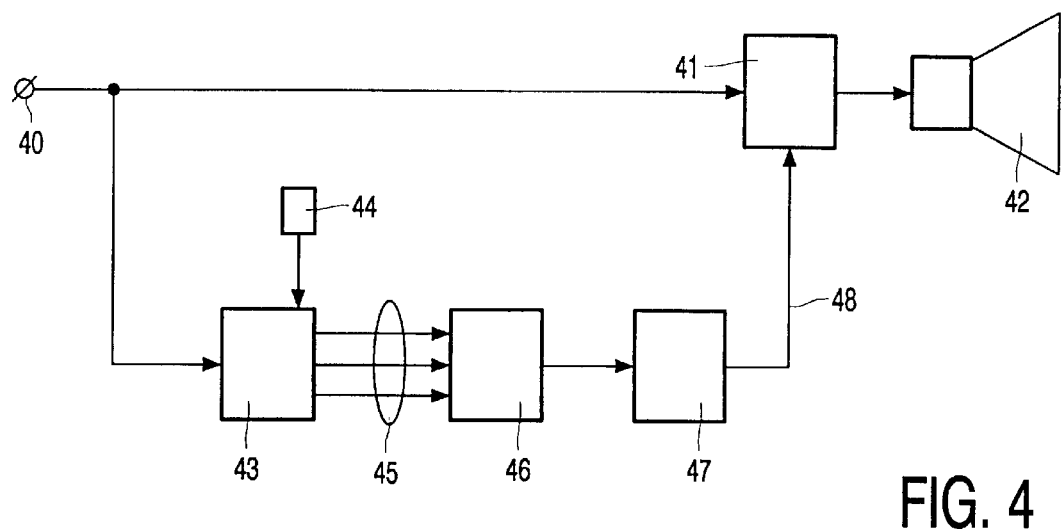
FIG. 4 is a diagrammatic representation of an apparatus according to the invention for processing an image.

FIG. 4 represents an apparatus for processing a video signal 40, which video signal 40 comprises a variety of images. The apparatus comprises an image processor 41, which is arranged for processing the video signal 40 to obtain an enhanced video signal. This enhanced video signal is then displayed on a display screen 42. Although FIG. 4 shows the display screen 42 as part of the same apparatus that includes the image processor 41, it may be clear that the display screen 42 may also be arranged independently of the apparatus and can receive the enhanced video signal from the apparatus via a network.

The image processor 41 can enhance the video signal 40 based on information about the motion or depth of individual images in the video signal 40. For example, it is possible for the image processor 41 to process the video signal 40, so that a user can watch the image from another angle by separately rotating, based on depth information, individual objects determined by a group of blocks, and thus generating a correct reproduction from another angle. This may provide, for example, a stereoscopic reproduction. Motion information may be used for detecting and marking moving objects, for example, to be used for automatic surveillance cameras. The thus obtained video signal with marked objects provides an enhancement for the user of these cameras, because they can now detect the image changes much faster.

In another possible application the image processor 41 enhances the video signal 40 which is offered, for example, in a compressed format such as MPEG, by producing a video signal that is compressed more efficiently. An individual object determined via a group of blocks, which object occurs in a number of images in the video signal 40, may now be compressed by storing pixel information about the object once-only and storing only the motion vector or depth information of this object for other images this object occurs in. Since this information requires less storage capacity than the pixel information of the complete object, a method such as this one can provide a considerably enhanced compressed video signal.

For clarity, the explanation below is about the function of elements of the system only when a first block depth is determined, but it may be clear from the above that the movement of a first block can be determined in similar manner.

The apparatus further includes a collector 43, a matcher 46 and a selector 47. The collector 43 is arranged for making a set 45 of candidate values for determining an area to be matched from the second image. The set 45 made by the collector 43 includes, inter alia, previously determined depths of blocks adjacent to the first block. The depths of adjacent blocks will generally show little mutual difference. The depths of blocks adjacent to the first block therefore form a good starting point for determining the depth of the first block and are therefore used as candidate values for this depth. To this end there is a storage system 44 on which this depth and other previously determined depths can be stored, so that the collector 43 can use them when making the set 45 of candidate values.

The collector 43 sends the set 45 of candidate values on to a matcher 46. The matcher 46 determines for each candidate value from the set, on the basis of said candidate value, an area to be matched from the second image. Subsequently, the matcher 46 matches the block from the first image with this area and the matcher 46 calculates an associated matching area, as is described above. For this purpose, methods mentioned earlier may be implemented, such as the mean square error, the mean absolute difference, the sum of absolute differences or the sum of square errors.

After the matching errors of the candidate values from the set 45 have been calculated, a selector 47 chooses the optimal candidate value 48 from the set 45 on the basis of the calculated matching errors. The optimal candidate value 48 is the candidate value having a relatively low matching error. The selector 47 then sends the optimal candidate value 48 to the image processor 41. Repeating this procedure for various blocks from an image provides depth information for this image. Based on the thus provided depth information, the image processor 41 can process the video signal 40 to obtain an enhanced video signal. This enhanced video signal may then be displayed on the display screen 42.

The system determines a variety of candidate values which are determined on the basis of properties of the first image. The collector 43 adds a candidate value to said set 45, which candidate value comes from this variety of candidate values.

The properties of the first image also include temporal changes of the value of previously chosen optimal candidate values for blocks from the first image. To determine the variety, the system makes a histogram of said changes. Subsequently, the system determines the variety in proportion to a distribution in the histogram, as described above with reference to FIG. 1, FIG. 2 and FIG. 3.

What is claimed is:

1. A method for choosing an optimum value for matching a first group of pixels of a first image to a second group of pixels of a second image, comprising the steps of:
    (a) determining a variety of first values corresponding to properties of said first image;
    (b) creating a set of candidate values including at least one of said first values, said candidate values corresponding to respective candidate groups of pixels;
    (c) calculating for each candidate group of pixels, a respective matching error between said first group of pixels and said candidate group of pixels;
    (d) selecting, based upon said matching errors, an optimum candidate value from said set of candidate values; and
    (e) using said optimum candidate value to select said second group of pixels.

2. A method as claimed in claim 1 wherein the properties of the first image comprise temporal changes of a value of previously chosen optimal candidate value.

3. A method as claimed in claim 2, wherein a histogram of said temporal changes is made and the varieties are determined in proportion to a distribution in the histogram.

4. A method as claimed in claim 1 wherein properties of the first image comprise a direction of temporal changes of a value of previously chosen optimal candidate values.

5. A system for choosing an optimum value for matching a first group of pixels of a first image to a second group of pixels of a second image, comprising:
    (a) a collector for determining a variety of first values corresponding to properties of said first image and for creating a set of candidate values including at least one of said first values, said candidate values corresponding to respective candidate groups of pixels;
    (b) a matcher for calculating for each candidate group of pixels, a respective matching error between said first group of pixels and said candidate group of pixels; and
    (c) a selector for selecting, based upon said matching errors, an optimum candidate value from said set of candidate values.

6. A system as claimed in claim 5, wherein the properties of the first image also include temporal changes of the value of previously chosen optimal candidate values for blocks from the first image.

7. A system as claimed in claim 6, wherein the system is arranged for making a histogram of said changes and for determining the variety in proportion to a distribution in the histogram.

8. A system as claimed in claim 5, wherein the properties of the first image also include a direction of temporal changes of a value of previously chosen optimal candidate values for blocks from the first image.

9. An apparatus for processing a video signal (40) that comprises a variety of images, including:

a system as claimed in claim 5, and an image processor for processing a video signal to obtain an enhanced video signal based on one or more optimal candidate values as determined by said system.

10. An apparatus as claimed in claim 9, wherein the apparatus further includes a display system for displaying the enhanced video signal.

\* \* \* \* \*